United States Patent [19]

Ohto et al.

[11] 3,886,865

[45] June 3, 1975

[54] PLANOGRAPHIC PRINTING PLATES COMPRISING ORGANIC POLYSILOXANES

[75] Inventors: Michihiro Ohto, Tokyo; Atsumi Noshiro, Kanagawa; Minoru Takamizawa; Yoshio Inoue, both of Gunma, all of Japan

[73] Assignee: Dai Nippon Printing Co., Ltd., Japan

[22] Filed: May 3, 1974

[21] Appl. No.: 466,603

[30] Foreign Application Priority Data

May 9, 1973 Japan .............................. 48-51332

[52] U.S. Cl. .................... 101/456; 96/33; 96/35.1; 96/36.3; 96/86 P; 96/87; 96/115 R; 101/453; 101/465

[51] Int. Cl. .......................... G03c 1/68; G03f 7/10

[58] Field of Search ......... 96/33, 35.1, 115 R, 86 P; 101/456, 453, 465

[56] References Cited

UNITED STATES PATENTS

| | | | |
|---|---|---|---|
| 3,677,178 | 7/1972 | Gipe | 96/33 |
| 3,772,016 | 11/1973 | Anderson et al. | 96/33 |
| 3,775,115 | 11/1973 | Sorkin et al. | 96/33 |
| 3,782,940 | 1/1974 | Ohto et al. | 96/35.1 |

*Primary Examiner*—Ronald H. Smith
*Attorney, Agent, or Firm*—Toren, McGeady and Stanger

[57] ABSTRACT

A planographic printing plate, on the base plate of which are ink-receptive and ink-repellent areas, the ink-repellent area being covered with a layer produced by polymerizing and curing a composition comprising a certain photopolymerizable organopolysiloxane, a photosensitizer and a solvent. The ink repellency is excellent, and such planographic printing plates have a superior printability on the press.

5 Claims, 4 Drawing Figures

PLANOGRAPHIC PRINTING PLATES COMPRISING ORGANIC POLYSILOXANES

FIELD OF THE INVENTION

The present invention relates to planographic printing plates, and more particularly to a planographic printing plate having a layer produced by polymerizing and curing a photopolymerizable organopolysiloxane, a photosensitizer and a solvent, and to the method for preparing them.

DESCRIPTION OF THE PRIOR ART

Planographic printing, unlike letter-press or gravure, uses a printing plate having no areas raised above or depressed below the surface but provided with image and nonimage area substantially on the same printing surface. The usual process of planographic printing, which is worked on the theory that water and fatty oil are immiscible, is carried out by the following steps: (1) the nonimage areas are made water-receptive by a chemical or mechanical treatment, while the image areas are made ink-receptive by applying a fatty resin thereon; (2) both image and nonimage areas are dampened, but the image areas reject the dampening solution; and (3) both image and nonimage areas are inked, but only the image areas hold the ink, so that the ink is transferred to the paper on the press.

One of the difficulties inherent in practicing the planographic printing is that the dampening solution applied to the plate flows back into the train of inking rollers on the press during the course of the printing run, causing emulsification of the ink. In addition to back flowing, the dampening solution also tends to flow forward over the copy sheet, causing it to soil, curl and change in dimension. This creates special difficulties in securing accurate registration in multiple color printing where the copy sheet undergoes several trips through the press. Further, in the planographic printing, it has been very difficult to maintain the delicate balance between the amount of ink fed to the printing plate and the amount of the dampening solution applied to the surface of the plate, which is required for the uniformity of color tone as well as the fidelity of the image.

Although, in order to overcome the above-described difficulties, attempts have been made to develop planographical techniques wherein the dampening solution is dispensed with, no satisfactory solution of practical value has been obtained. For example, a proposal was to provide a planographic printing plate prepared by forming layers of a diazo-type photosensitive composition and a dimethylpolysiloxane rubber on a substrate of aluminum, lay a positive pattern thereover, expose the layer to light to make the exposed areas insoluble to water while removing the unexposed areas in the same layer by developing treatment, and finally remove the dimethylpolysiloxane rubber layer in the unexposed areas down to the underlying metal, leaving behind the insolubilized areas of the photosensitive diazo layer (see British Specification No. 1,146,618.) Another proposal was to provide a planographic printing plate prepared by forming sequentially a diazo photosensitive layer, an adhesive layer and a silicone rubber layer on an aluminum base. The plate is exposed to light through a negative transparency mounted thereover, and developed by utilizing the properties of the photosensitive layer that it is water insoluble and upon exposure to light becomes decomposed. The plate is then stripped of the light-exposed parts of the silicone rubber layer, to give the desired printing plate (see U.S. Pat. No. 3,511,178.).

In the both cases described above the presence of a non-photosensitive silicone rubber layer between the photosensitive diazo layer and the positive or negative pattern makes it difficult for the image or pattern on the positive or negative pattern to be reproduced accurately and uniformly. Further, the removal of the silicone rubber layer from the plate is conducted by utilizing the variations of solubility in a solvent, of the photosensitive layer and, therefore, the image formed by the silicone rubber layer is not sharply cut on the edge. Furthermore, the printing plate of these conventional methods is prepared by complicated procedures of forming two or three different layers overlaid on each other, on the surface of the base or substrate, followed by exposure to light and developing.

The inventors of the present invention, having had carried out researches with a view to solving the various disadvantages of the prior art techniques, previously developed a certain method of preparing planographic printing plates (see Japanese Public Disclosure No. 48-33,910 or German Offenlegungsschrift No. 2,267,493). According to the method, the base plate or substrate of aluminum was coated with a layer of a photopolymerizable composition comprising at least one photopolymerizable silicone, a photosensitizer and a solvent, the photopolymerizable silicone containing at least one photopolymerizable organic silicon unit represented by the general formula;

$$\mathrm{R^1HC{=}C(R^2){-}\underset{\underset{O}{\|}}{C}{-}O{-}R^3{-}\overset{\overset{R^4_a}{|}}{Si}X_bO_{\frac{3-a-b}{2}}} \qquad (I)$$

where $R^1$ was a hydrogen atom or an unsubstituted or halogen-substituted phenyl radical; $R^2$ was a hydrogen atom or a methyl radical; $R^3$ was an unsubstituted or halogen-substituted divalent $C_{1-10}$ hydrocarbon radical; $R^4$ was an unsubstituted or halogen-substituted monovalent $C_{1-10}$ hydrocarbon radical; X was a hydroxy radical or a $C_{1-4}$ alkoxy radical; *a* was 0, 1 or 2; and *b* was 0, 1 or 2, with the proviso that $(a+b) = 0$, 1 or 2, or by the general formula $$\mathrm{R^1HC{=}C(R^2){-}\underset{\underset{O}{\|}}{C}{-}O{-}(R^3{-}O)\ {-}\overset{\overset{R^4_m}{|}}{Si}X_nO_{\frac{3-m-n}{2}}} \qquad (II)$$

where $R^1$, $R^2$, $R^3$, $R^4$ and X were as defined above; l was 0 or 1, and *m* and *n* were each 0, 1 or 2, with the proviso that $(m+n)$ was 0, 1 or 2.

The above-described layer of the photopolymerizable composition was overlaid with a positive pattern and expressed to ultraviolet light or strong visible light, followed by developing and fixing, to form a film that is strong, insoluble and resistant to heat, chemicals and corrosion in the exposed areas, while washing away the layer in the unexposed areas by a solvent or some other solution. Thus, a hardened layer of the photopolymerizable organosiloxane was formed on the base metal, to make a printing plate of the planographic type which could be used in the absence of the water or dampening solutions.

The same inventors still dissatisfied with such results have since then made further studies for the improvement of the planographic printing plates. As the result of the studies, it has been discovered that the layer of the photopolymerizable composition tended to become more or less softened, so that its surface was apt to be injured by a positive pattern placed in contact therewith, even with care and under reduced pressure, prior to exposure to light. Further, it has become known that the photopolymerizability of the unit of formula (I) could be improved by the presence in high concentration, of the photosensitive unsaturated radical of the general formula $$\overset{R_1}{\underset{|}{HC}} = \overset{R_2}{\underset{|}{C}} - \underset{\underset{O}{\|}}{C} - O - \qquad \text{(III)}$$

where $R^1$ and $R^2$ are as defined above, and such improved photopolymerizability resulted in making the layer of the photopolymerizable composition much softer. Further the photopolymerized, hardened film formed by applying light to the more or less softened layer through a positive pattern, followed by developing and fixing treatments would, disadvantageously, become less repellent to the printing ink.

The inventors in this connection have further discovered that the durability of a planographic printing plate in the press was variable, depending on the molecular weight of the photopolymerizable silicone used; that is to say, the low molecular weight of the photopolymerizable silicone worked to reduce the durability of the printing plate in use.

SUMMARY OF THE INVENTION

The present invention now proposes improved planographic printing plates, free of the various defects inherent in the prior art as described above.

According to the invention, there are provided nonimage areas on the base metal of the planographic printing plate, such nonimage areas being covered by sections of the photopolymerized, hardened and waterinsoluble layer of a composition containing as a main component a photopolymerizable organopolysiloxane of the general formula:

$$\left[\overset{R^1}{\underset{|}{HC}} = \overset{R^2}{\underset{|}{C}} - \underset{\underset{O}{\|}}{C} - O - R^3 - \overset{(CH_3)_a}{\underset{|}{Si}}O_{\frac{3-a}{2}}\right]_l \left[C_6H_5SiO_{\frac{3}{2}}\right]_m \left[\begin{matrix} CH_3 \\ | \\ SiO \\ | \\ R^4 \end{matrix}\right]_n \qquad \text{(IV)}$$

where $R^1$ is a hydrogen atom, an unsubstituted or halogen-substituted phenyl radical including chlorophenyl and bromophenyl; $R^2$ is a hydrogen atom or a methyl radical; $R^3$ is a divalent hydrocarbon radical having 1 to 3 carbon atoms including methylene, ethylene and propylene; $R^4$ is a methyl or trifluoropropyl radical; *a* is 0 or 1; *m* and *n* are each a positive integer with the proviso that *n* exceeds 25 while $n/l$ and $n/m$ are 25 to 2,000 and from 2.5 to 50, respectively.

The improved planographic printing plates have the following features in practical use:

1. the dampening solution is dispensed with;
2. high fidelity is attained, with sharp printed edges;
3. Printing is done with extreme clearness and delicacy; and
4. the printing plates can stand for a continuously long press run.

The method for preparing the planographic printing plates of the invention will be described in the following specification, in combination with the drawings wherein.

Figure 1:
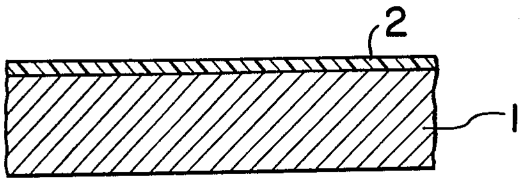
FIG. 1 is a schematic illustration of a cross-section of a fragment of a planographic plate at a first stage of manufacture.

FIG. 1 shows a base metal 1, which is overlaid with a layer 2, from 3 to 10 μm thick, formed by drying a solution of the photopolymerizable organopolysiloxane as a main component in at least one organic solvent together with at least one photosensitizer.

The organic solvents are, for example, ketones such as methylethyl ketone and methylisobutyl ketone, aromatic hydrocarbons such as benzene, toluene and xylene and chlorinated solvents such as trichloroethylene and tetrachloroethylene.

The photosensitizers are exemplified by amino, nitro or phenol compounds, such as 4-phenylphenol, 4-nitroaniline, picramide, 2,6-dichloro-4-nitroaniline, 2,4-dinitrophenol; aldehyde and ketone compounds, such as benzaldehyde, acetophenone, 4,4′-diaminobenzophenone, 4,4′-bisdimethylbenzophenone (Michler's ketone); quinone compounds, such as benzoquinone, anthraquinone, 1,2-naphthoquinone; anthrone compounds, such as 3-methyl-1,3-diazo-1,9-benzanthrone; dyes, such as Malachite Green, Methylene Blue, Chrome Green, Rhodamine Blue, Azo Green- TEG; and pyrilium salts, such as 2,4,6-triphenyl-pyrilium perchlorate, 2,4,6-triphenylthiapyrilium perchlorate, 2,4,6-triphenylpyrilium-fluoborate, and 2,4,6-triphenylthiapyrilium fluoborate. The photosensitizer becomes excited on absorption of light, and interacts with the organopolysiloxane of formula (IV) above, imparting the excited energy to the organopolysiloxane, thereby accelerating the velocity of its photopolymerization.

Figure 2:
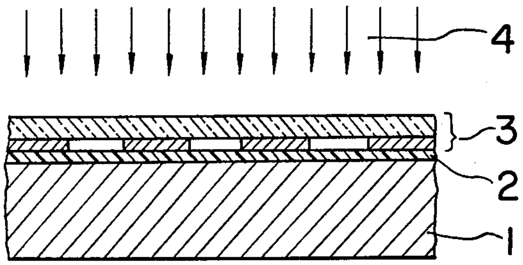
FIG. 2 is a schematic illustration of the planographic plate of FIG. 1, shown during the illumination step.
Figure 3:
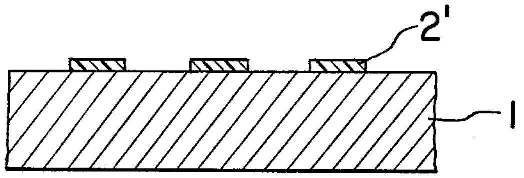
FIG. 3 is a schematic illustration of the planographic plate of FIG. 2, shown with the image areas of the organopolysiloxane removed.

FIG. 2 shows a positive pattern 3, bearing letters, symbols, figures, pictures or any other pattern, place in contact with the surface of layer 2 before the structure is exposed to light 4. Upon exposure to light 4, followed by developing and fixing, the exposed areas in layer 2 begin to form films, characterized by being resistant to heat, chemicals and mechanical erosion, etc., insoluble to developing solutions and strong enough for long press runs. The exposed area in layer 2 are shown in FIG. 3, as insoluble layers 2′. On the other hand, the unexposed areas in layer 2 are washed away by treatment with a solvent, laying bare the underlying base plate 1. Only the photopolymerized and hardened layers 2′ are left on the surface of base plate 1, which is suitable for use as the planographic printing plate of the present invention.

The base plate 1 may be the same material as hitherto used in planographic printing, being a sheet of copper, aluminum, stainless steel, zinc, iron, nickel-plated copper or iron, chromium-plated iron, or various plastics.

The base plate 1 preferably has a uniform thickness and a smooth surface so that the solution of the photopolymerizable organopolysiloxane, as a main component in a solvent, or solvents together with a photosensitizer or photosensitizers can be uniformly applied. The surface of the base metal should be cleaned of any oily substances, dirt or dust by a conventional manner before the photopolymerizable coating is applied in order to prevent the possible occurrence of uneven coating or pinholes. It is sometimes required to roughen the surface of the base plate, so that the overlaid layer 2 can be in more intimate contact with the base layer.

Further, to increase the adhesion of layer 2 to the surface of base plate 1, it is preferred to previously apply a primer there between. Suitable primers for the purpose are, for example, silanes, such as vinyl-tris(2-methoxyethoxy)silane, 3-glycidoxypropyltrimethoxysilane, 3-methacryloxypropyltrimethoxysilane, N-(3-trimethoxysilylpropyl) ethylene diamine, and 3-aminopropyltriethoxy silane, either alone or in mixture, and partially hydrolyzed or cohydrolyzed products thereof. The application of the primer on the surface of base plate 1 may be conducted by a conventional method, for example, by means of roller, brush, rod or spray.

A more detailed description of the photopolymerizable organopolysiloxane of formula (IV), a main component of the layer 2, follows.

This organopolysiloxane is required to possess the following features:

1. that it must give the resulting layer 2 the minimum stickiness to positive pattern 3, as well as hardness of such extent, that there is no scarring of its surace when contacted with positive pattern 3;
2. that it must be polymerized and hardened in a considerably short period of time, by means of ultraviolet light or strong visible light, to form a layer, insoluble to developing solutions;
3. that the insolubilized layer 2', obtained through the exposure to light, developing and fixing steps, must have a sufficient ink-repellancy in planographic printing, without use of the dampening solution; and
4. that the layer 2' must be strong, highly resistant to wear and endurable for long press runs.

The presence of the following structural unit in the above-mentioned general formula (IV) of the photopolymerizable organopolysiloxane:

$$\left[ HC(R^1) = C(R^2) - \underset{\underset{O}{\|}}{C} - O - R^3 - \overset{(CH_3)_a}{\overset{|}{Si}}O_{\frac{3-a}{2}} \right] \quad (V)$$

acts to impart reactivity to light to the photopolymerizable organopolysiloxane. The presence of the structural unit $$\left[ C_6H_5SiO_{\frac{3}{2}} \right] \quad (VI)$$

acts to increase the hardness of layer 2 prior to exposure to light and, on the other hand, to lessen its stickiness; while the presence of the structural unit $$\left[ \begin{matrix} CH_3 \\ | \\ SiO \\ | \\ R^4 \end{matrix} \right] \quad (VII)$$

acts to impart ink-repellency to the insolubilized, hardened layer 2'.

Further, the subscript of the above-mentioned structural units, i.e., $l$, $m$ and $n$, affect the durability of the finished printing plates in the press run. It is preferred, in particular, that the value of $n$ is as great as possible, necessarily exceeding 25, for the purpose of improving the ink-repellency to the nonimage areas after exposure, developing and fixing, as well as the printing durability of the product.

Furthermore, the hardness of dried layer 2 prior to exposure to light and its stickiness are affected by the value of $n/m$. That is to say, as the value decreases ink-repellency and printing durability will become less while hardness is affected favorably; on the other hand, as the value increases, ink-repellency will be improved, but the hardness of the dried layer 2 prior to exposure to light will be so soft that the layer tends to be scarred on its surface when a positive pattern is placed in contact therewith. Therefore, the value of $n/m$ should be between 2.5 and 50, preferably between 5 and 25.

The value of $n/l$, controls the photopolymerizability of the photopolymerizable organopolysiloxane as well as the ink-repellency of the nonimage areas. That is as the value decreases, photopolymerizability is improved but ink-repellency and printing durability are reduced. However, as it increases ink-repellency is improved but photopolymerizability is reduced, and the application of light is required for a longer time. Accordingly, the value of $n/l$ should be limited to between 25 and 2,000, preferably between 50 and 1,000.

The photopolymerizable organic radical $$HC(R^1) = C(R^2) - \underset{\underset{O}{\|}}{C} - O - \quad (VIII)$$

contained in the structural unit (V) may be exemplified by acryloxy, methacryloxy, cinnamoyloxy or halogenocinnamoyloxy radical.

The photopolymerizable organopolysiloxane of formula (IV) is prepared by co-condensation of the siloxanes of the structural units (VI) and (VII) with the organosilane or organosiloxane having the general formula $$HC(R^1) = C(R^2) - \underset{\underset{O}{\|}}{C} - O - R^3 - \underset{\underset{X_b}{|}}{\overset{(CH_3)_a}{\overset{|}{Si}}} - O_{\frac{3-a-b}{2}} \quad (IX)$$

where $R^1$, $R^2$ and $R^3$ are defined above, X is a hydroxyl radical or an alkoxy radical having from 1 to 4 carbon atoms, *a* is 0 or 1, and *b* is 0, 1 or 2, with the proviso that $(a + b)$=0, 1, 2 or 3.

Examples of such preparation methods are as follows.

1. Dimethyldichlorosilane, methyltrifluoropropyldichlorosilane, phenyltrichlorosilane and a silane of formula (IX) where $(a + b)$=3 are subjected to cohydrolysis followed by washing and neutralization and then to condensation reaction to obtain a copolymer of a desired degree of polymerization.

2. Dimethyldichlorosilane, methyltrifluoropropyldichlorosilane, and phenyltrichlorosilane are first cohydrolyzed and neutralized, and the resulting product is mixed with the alkoxysilane of formula (IX) where $(a+b)$=3, followed by the condensation step, to finally produce a copolymer of a desired degree of polymerization.

3. An organopolysiloxane having the general formula $$Cl-\left(\begin{array}{c}CH_3\\ |\\ SiO\\ |\\ R^4\end{array}\right)_n-\begin{array}{c}CH_3\\ |\\ Si\\ |\\ R^4\end{array}-Cl \qquad (X)$$

where $R^4$, as defined above, is reacted with a hydrolyzate of the phenyltrichlorosilane of structural unit (VI) in the presence of a hydrogen chloride catcher, to produce a block copolymer. The product is then subjected to condensation reaction with the alkoxysilane of formula (IX) where $(a+b)$=3, to finally obtain a copolymer of a desired polymerization degree.

4. The organopolysiloxane of (3) above is subjected to condensation with a cohydrolyzate of phenyltrichlorosilane and a silane of formula (IX) where $(a+b)$=3, to obtain a copolymer having a desired degree of polymerization.

5. A mixture of a hydroxy-terminated diorganopolysiloxane having the general formula $$HO-\left(\begin{array}{c}CH_3\\ |\\ Si-O\\ |\\ R^4\end{array}\right)_n-H \qquad (XI)$$

where $R^4$ as defined above, a hydrolyzate of the phenyltrichlorosilane having the structural unit (VI) and a silane of formula (IX) where $(a+b)$=3 or its hydrolyzate is subjected to condensation, to obtain a copolymer having a desired polymerization degree.

6. The hydroxy-terminated diorgano-polysiloxane of formula (XI) is reacted with a phenyltrichlorosilane in the presence of a hydrogen chloride catcher. The reaction product is then subjected to hydrolysis, and the resulting hydrolyzate is then condensed with the silane of formula (IX) where $(a+b)$=3, or its hydrolyzate, to produce a polymer having a desired polymerization degree.

The silanes of formula (IX) where $(a+b)$=3 are exemplified by chlorosilanes, such as acryloxymethyltrichlorosilane, 3-methacryloxypropyltrichlorosilane, 3-acryloxypropylmethyldichlorosilane, 3-acryloxypropylmethyldimethoxysilane, methacryloxymethyl trihydroxysilane, 3-methacryloxypropylmethoxydichlorosilane, cinnamoyloxymethyltrichlorosilane, chlorocinnamoyloxymethyltrimethoxysilane, 3-cinnamoyloxypropyl-trimethoxysilane or -trichlorosilane, 3-methacryloxypropyltrimethoxydisilane, mono-addition compounds of trichlorosilane to ethyleneglycoldiacrylate or -methacrylate, and mono-addition compounds of methyldichlorosilane to triethyleneglycoldimethacrylate, and also by silanes in which a part or the whole of the chlorine atoms directly bonded to silicon atoms in the above-mentioned chlorosilanes are replaced with other halogen atoms, acyloxy radicals, hydroxy radicals or alkoxy radicals having from 1 to 4 carbon atoms, and partial condensates thereof.

The additives to the photopolymerizable organopolysiloxane according to the invention may include, besides the above-mentioned solvents and photosensitizers, solvents of halogen-substituted hydrocarbons, esters and ethers and alcohols, inert to the photopolymerizable organopolysiloxane, such solvents being used as the diluent. The additives may also include thermal polymerization inhibitors of quinones, such as hydroquinone and benzoquinone, amines, hydrazine derivatives, aldehydes and ascorbic acid, and known fillers usually applied to the photopolymerizable organopolysiloxane, such as, for example, finely divided silica.

The thermal polymerization inhibitors may be used at an optional amount, preferably in the range from about 0.01 to about 1.0% by weight based on the weight of the photopolymerizable organopolysiloxane of formula (IV), the range having been set forth by considering that the inhibitor works to improve the storage stability of the composition, or to prevent it from reacting in the dark, and further to keeep the composition from becoming thermally polymerized when it is applied to the base plate 1 to form the layer 2 thereon, and when the layer 2 becomes dried by evaporation of the solvent.

According to the invention, a positive or negative transparency prepared by a photographic process is used as the positive pattern 3 for the preparation of the planographic printing plate. Suitable sources of the light to be applied from above the positive pattern 3 are, for example, xenon lamps and mercury arc lamps of low, medium or high pressure, capable of providing radiation rich in ultraviolet light.

The planographic printing plate of the present invention is prepared by coating base plate 1 with the above-given polymerizable composition to form layer 2, over which is laid positive pattern 3. The structure is exposed to light and thereafter subjected to developing, drying and thermal curing, to form photopolymerized, hardened layer 2', having excellent heat-, solvent- and erosion-resistance. It is preferred to carry out the exppsure-to-light process in an atmosphere deficient of air or oxygen, for example, in a plastic sheet bag sealed and kept under reduced pressure or vacuum.

The developing solutions which may be employed are solvents of aromatic and aliphatic hydrocarbons, chlorinated aliphatic hydrocarbons and ketones, including benzene, toluene, xylene, cyclohexane, methylethyl ketone, methylisobutyl ketone, trichloroethylene and tetrachloroethylene, either singly or in mixture.

The exact mechanism of forming layer 2' which is insoluble to the solvent is not fully understood but, it may perhaps be that, when base plate 1 is coated with the photopolymerizable composition, dried, exposed to light, the photosensitizer contained in the composition becomes excited by light energy, and the unsaturated radical of general formula (VIII) in the same composition begins to polymerize, resulting in the formation of a hardened insoluble film in the exposed areas. Incidentally, the unsaturated radical of general formula (VIII) in the unexposed areas remains unaffected by light and unpolymerized, and can be easily washed away by a solvent.

Figure 4:
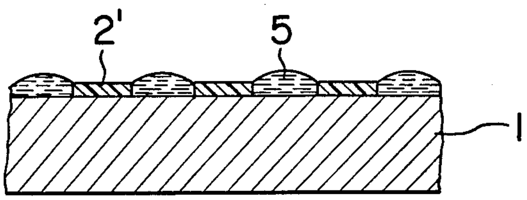
FIG. 4 is a schematic illustration of the planographic plate of FIG. 3, shown with ink applied to the plate.

The finished planographic printing plate of the present invention, as shown in FIG. 3, of the base plate 1, has on its suface image areas indicated by layer 2' and the underlying base surface exposed in the nonimage areas. Layer 2' composed mainly of the photopolymerizable organopolysiloxane of formula (IV), has high repellancy and low adhesion to ink. Accordingly, when the printing ink is applied to the plate surface by a roller during a press operation, the ink is not transferred onto the image areas, but rather is transferred to the areas unexposed to light, as is shown in FIG. 4 by numeral 5. Such ink transfer is due to the fact that the adhesion between the ink and the image areas, i.e., the polymerized hard layer 2', is weaker that between the ink and the roller or than the cohesive force of ink molecules. Thus, the use of a dampening solution is not needed.

The planographic printing plate of the present invention can be prepared very simply by first coating the surface of the base plate with the photopolymerizable composition, drying the coating layer, placing a positive pattern on the dried coating layer, and then subjecting the structure to exposure to light, followed by developing and fixing. The simplicity of the method has the advantage of contributing to the commercialization of the process. Further, according to the method of the invention, the images, which are formed directly on the base plate, are clear and sharp from edge to edge, with excellent resolving power and high fidelity.

A further advantage of the planographic printing plate of the invention lies in its excellent printability due to the great difference in physical properties existing between the bare base plate 1 and the polymerized, hardened layer in the image areas.

According to the present invention, the photopolymerizability of a coating composition as well as the ink-repellency and the hardness of the resulting layer have been greatly improved by employing a composition which has as its main component, the photopolymerizable organopolysiloxane of formula (IV) having structural units (V), (VI) and (VII) in the specified ratios. Specifically, the subscripts *l*, *m* and *n* to the structural units (V), (VI) and (VII), respectively, are individually and correlatively defined, as follows: *l* is the effect on effective in such photopolymerizability, *m* is the effect on the improvement of hardness; and *n* is the effect on ink-repellency.

To summarize, the invention can provide planographic printing plates, improved for practical and commercial use with respect to the photopolymerizability of the coating composition, the ink-repellency and the hardness of the resulting layer which is hard enough to be safe from scarring on its surface. Thus the plate is provided with excellent printability.

The preparation of the various photopolymerizable organopolysiloxanes will be illustrated by way of the following Examples 1–11, Examples 1–6 illustrating the present invention, Examples 7–11 setting forth controls. The characteristic properties of various planographic printing plates made by using each of thos photopolymerizable organopolysiloxanes are illustrated in Example 12. In the examples, are references to parts are intended to be parts by weight.

EXAMPLE 1

124 parts of a 30% solution of α-ω-dihydroxydimethylpolysiloxane having the general formula $$HO\left(\begin{array}{c}CH_3\\|\\Si-O\\|\\CH_3\end{array}\right)_{50}H$$

in toluene and 62 parts of a 30% solution of the hydrolyzate of phenyl trichlorosilane in toluene were mixed together, and to the mixture were added 5.0 parts of 3-methacryloxypropyltrimethoxysilane, 0.001 part of hydroquinone and 0.46 part of paratoluene-sulfonic acid. The resulting mixture was subjected to further condensation reaction under reflux of toluene for 48 hours, while removing water which is being produced, to obtain a solution of a copolymer, having a viscosity of 28.4 cs. and a solid content of 30%.

EXAMPLE 2

247 parts of a 15% solution of α-ω-dihydroxydimethylpolysiloxane having the general formula $$HO\left(\begin{array}{c}CH_3\\|\\SiO\\|\\CH_3\end{array}\right)_{500}H$$

in toluene and 60 parts of a 15% solution of the hydrolyzate of phenyltrichlorosilane in toluene were mixed, and to the mixture were added 0.25 part of 3-methacryloxypropyltrimethoxysilane, 0.01 part of dibutylhydroxy toluene and 0.1 part of dibutyltindilaurate. The resulting mixture was subjected to further condensation reaction under reflux of toluene for 8 hours while removing water which was produced, to finally obtain a solution of copolymer having a viscosity of 32.0 cs. and a solid content of 15%.

EXAMPLE 3

To 1,022 parts of toluene were added 258 parts dimethyldichlorosilane and 53 parts of phenyltrichlorosilane. The resulting mixture. added to 1,124 parts of water for hydrolysis, followed by washing with water, neutralization and dehydration treatment, to produce a solution of cohydrolyzate having a 15% concentration of siloxane. To 1,200 parts of the cohydrolyzate solution thus produced were added 7.4 parts of 3-methacryloxypropylmethyldimethoxysilane, 0.1 part of methoxyhydroquinone and 0.4 part of tin dioctoate. The resulting mixture was then subjected to a condensation reaction under reflux of toluene for 5 hours while removing water produced, to obtain a solution of a copolymer, having a viscosity of 20.1 cs. and a solid content of 15%.

EXAMPLE 4

To 86 parts of a 15% solution of the hydrolyzate of phenyltrichlorosilane in toluence was added 0.23 part of pyridine as the hydrogen chloride catcher. The mixture, after having been well stirred, was subjected to a hydrolysis reaction at room temperature for 1 hour, by adding thereto dropwise, 247 parts of a 15% solution of siloxane having the molecular formula $$Cl-\left(\begin{matrix}CH_3\\ |\\ Si\\ |\\ CH_3\end{matrix}-O\right)_{299}\left(\begin{matrix}CH_3\\ |\\ Si\\ |\\ CH_2CH_2CF_3\end{matrix}-O\right)_{200}\begin{matrix}CH_3\\ |\\ Si\\ |\\ CH_3\end{matrix}-Cl$$

in toluene, followed by washing treatment to remove the hydrochloric acid salt of pyridine and any pyridine remaining unreacted, to obtain a solution of siloxane having a 15% concentration. To this solution were added 0.5 part of 3-methacryloxypyropyltrimethoxysilane and 0.1 part of dibutyltindilaurate. The resultant mixture solution was then reacted to condensation under reflux of toluene for 8 hours while removing resultant water, to finally obtain a solution of copolymer having a viscosity of 35.0 cs. and a solid content of 15%.

EXAMPLE 5

To 194 parts of a 20% solution of the hydrolyzate of phenyltrichlorosilane in toluene were added dropwise 2.36 parts of pyridine as the hydrogen chloride catcher and 743 parts of a 20% solution of a siloxane having the molecular formula $$Cl-\left(\begin{matrix}CH_3\\ |\\ Si\\ |\\ CH_3\end{matrix}-O\right)_{199}\begin{matrix}CH_3\\ |\\ Si\\ |\\ CH_3\end{matrix}-Cl$$

in toluene, and reacted for 1 hour. From the reaction product was removed, by washing with water, the hydrochloric acid salt of pyridine produced and any remaining, unreacted pyridine. It was and then dehydrated, to obtain a solution of siloxane of 15% concentration. To this solution were added, in turn, 4.96 parts of 3-methacryloxypropyltrimethoxysilane, 0.5 part of paratoluene-sulfonic acid as the condensation catalyst and 0.1 part of dibutyl-hydroxy toluence, for condensation reaction under reflux of toluene for 35 hours, to obtain a solution of copolymer having a viscosity of 10.6 cs. and a solid content of 20%.

EXAMPLE 6

To 64.5 parts of a 10% solution of the hydrolyzate of phenyltrichlorosilane in toluene were added dropwise, 0.23 part of pyridine and 297 parts of a 10% solution of a siloxane having the molecular formula $$Cl-\left(\begin{matrix}CH_3\\ |\\ Si\\ |\\ CH_3\end{matrix}-O\right)_{399}\begin{matrix}CH_3\\ |\\ Si\\ |\\ CH_3\end{matrix}-Cl$$

in toluene, for reaction for 1 hour at room temperture. From the resulting reaction product was removed, by washing with water, any of the hydrochloric acid salt of pyridine produced and any pyridine remaining unreacted. It was then dehydrated, to obtain a solution of siloxane of 10% concentration. To this solution were added 0.5 part of 3-methacryloxytriethoxysilane and 0.1 part of tindioctoate, for reaction under reflux of toluene for 5 hours, to obtain a solution of copolymer having a viscosity of 18.9 cs. and a solid content of 10%.

EXAMPLE 7

84.8 parts of phenyltrichlorosilane and 52.1 parts of 3-methacryloxypropyltriethoxysilane were dissolved in 203 parts of toluene. The entirety of this solution was gradually added dropwise to 639 parts of water at a temperature below 25°C for hydrolysis, whereupon the layer of hydrochloric acid was separated. To 290 parts of the solution of cohydrolyzate thus produced were added 499 parts of a 30% solution of a siloxane having a molecular formula $$HO-\left(\begin{matrix}CH_3\\ |\\ Si\\ |\\ CH_3\end{matrix}-O\right)_{20}-H$$

in toluene, 0.05 part of hydroquinone and 2.0 parts of para-toluene-sulfonic acid. The resulting mixture solution was subjected to reaction under reflux of toluene for 30 hours, to obtain a solution of copolymer having a viscosity of 8.7 cs. and a solid content of 30%.

EXAMPLE 8

424 parts of phenyltrichlorosilane and 5.2 parts of 3-methacryloxypropyltrichlorosilane were dissolved in 1,482 parts of toluene. The entirety of this solution was gradually added dropwise to 2,151 parts of water at a temperature below 25°C for hydrolysis. To the cohydrolyzate solution thus produced was added 2.3 parts of pyridine. To the resulting mixture was added dropwise 1,977 parts of a solution of a siloxane having the molecular formula $$Cl-\left(\begin{matrix}CH_3\\ |\\ Si\\ |\\ CH_3\end{matrix}-O\right)_{399}\begin{matrix}CH_3\\ |\\ Si\\ |\\ CH_3\end{matrix}-Cl$$

in 15% toluene, for reaction for 1 hour at room temperature. From the reaction product was removed, by washing with water, any of the hydrochloric acid salt of pyridine produced and any remaining unreacted, pyridine. It was then dehydrated, to obtain a solution of siloxane of 15% concentration.

To this solution of siloxane were added 0.2 part of dibutylhydroxytoluene and 0.54 part of dibutyltindilaurate. The resulting mixture was subjected to condensation reaction under reflux of toluene for 3 hours, to finally obtain a solution of copolymer having a viscosity of 26.7 cs. and a solid content of 15%.

EXAMPLE 9

To 430 parts of a 15% solution of the hydrolyzate of phenyltrichlorosilane in toluene, were added dropwise, 2.3 parts of pyridine and 2,470 parts of a 15% solution of chlorodimethylpolysiloxane having the molecular formula

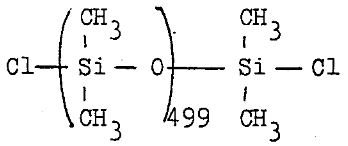

in toluene, for reaction at room temperature. From the reaction product was removed, by washing with water, any of the hydrochloric acid salt of pyridine produced and any of the remaining unreacted pyridine, to obtain a solution of copolymer. To the solution thus obtained were added, in turn, 62 parts of 3-methacryloxypropyltrimethoxysilane, 0.5 part of hydroquinone and 0.5 part of dibutyltin-dilaurate, for condensation reaction under reflux of toluene for 5 hours, to finally obtain a solution of copolymer having a viscosity of 31.0 cs. and a solid content of 15%.

EXAMPLE 10

A mixture of 1,235 parts of a 15% solution of a siloxane having the molecular formula

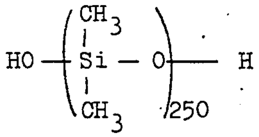

in toluene, 26 parts of a 15% solution of the hydrolyzate of phenyltrichlorosilane in toluene, 2.5 parts of 3-methacryloxypropyltrimethoxysilane, 0.01 part of hydroquinone and 0.6 part of dibutyltindilaurate was subjected to condensation reaction under reflux of toluene for 7 hours, while removing condensation water and methanol. As a result, a solution of copolymer having a viscosity of 13.0 cs. and a solid content of 15%, was obtained.

EXAMPLE 11

To a mixture of 64.5 parts of a 10% solution of the hydrolyzate of phenyltrichlorosilane in toluene and 0.23 part of pyridine was gradually added dropwise 297 parts of 10% solution of chlorodimethylpolysiloxane having the molecular formula

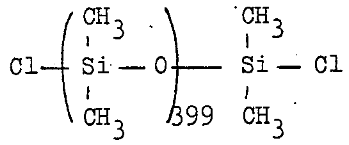

in toluene, for reaction at room temperature for 1 hour. From the reaction product was removed, by washing with water, any the hydrochloric acid salt of pyridine produced and any of the remaining unreacted pyridine, and then dehydrated, to produce a solution of siloxane having a 10% concentration. To this solution of siloxane were added 0.025 part of 3-methacryloxypropyltrimethoxysilane and 0.1 part of dibutyltindilaurate, and the resulting mixture was subjected to reaction under reflux of toluene for 10 hours, to obtain a solution of copolymer having a viscosity of 17.6 cs. and a solid content of 10%.

EXAMPLE 12

100 parts of each of the photopolymerizable organopolysiloxanes having different structural conditions with respect to the values of $n$, $n/m$ and $n/l$, as indicated in the following table, obtained in the preceding examples, was mixed with 3 parts of 4,4'-bis(dimethylamino)-benzophenon. The mixture was applied as a layer about 10 μm thick on the surface of a 3-methacryloxypropyltrimethoxysilane layer 0.05 μm thick previously provided on a sheet of aluminum 3 mm thick. Upon the upper layer, which had been dried, was placed a positive pattern. Each structure was exposed to light from a mercury arc lamp of super high pressure under reduced pressure for a period of time as indicated in the table, the predominant wavelength of the light being 365 nm and the intensity of the light being 110 W/cm$^2$ on the exposed surface. This step was followed by developing with a solution consisting of methylethylketone and toluene in a ratio of 1:1 by volume and fixing at 180°C for 30 minutes, to produce a planographic printing plate provided with the photopolymerized, hardened layer. The hardness of the layer before exposure, which property protects the layer surface from scarring, and the ink-repellency of the hardened layer, were tested and the results are shown in the table. Further, the test for printability of the printing plates was carried out on a Heidelberch Company printing machine KOR model, the results of which are shown in the table.

| | Photopolymerizable organopolysiloxane prepared by: | | | | | | | | | | |
|---|---|---|---|---|---|---|---|---|---|---|---|
| | Example 1 | Example 2 | Example 3 | Example 4 | Example 5 | Example 6 | Example 7 | Example 8 | Example 9 | Example 10 | Example 11 |
| Structural condtion: | | | | | | | | | | | |
| Value of n | 50 | 500 | 100 | 500 | 200 | 400 | 20 | 400 | 500 | 250 | 400 |
| Value of n/m | 3.33 | 7.14 | 4.0 | 5.0 | 6.67 | 8.0 | 5.0 | 2.0 | 10 | 83.3 | 8.0 |
| Value of n/l | 25 | 500 | 33.3 | 250 | 100 | 200 | 10 | 200 | 20 | 250 | 4,000 |
| Exposure to light, sec.* | 150 | 70 | 60 | 45 | 70 | 60 | 170 | 50 | 40 | 75 | ** |
| Hardness before exposure | Fair | Excellent | Good | Excellent | Good | Excellent | Poor | Fair | Fair | Poor | Viscous |
| Ink-repellency | Fair | Good | Good | Good | Good | Good | Scarce | Scarce | Scarce | Good | ** |
| Printability, sheets of paper | 15,000 | Over 40,000 | Over 40,000 | Over 40,000 | 30,000 | Over 40,000 | *** | *** | *** | *** | ** |

*Exposure time required for obtaining sufficient cure under the 7th step of Kodak Grey Scale No. 2.
**Not tested.
***No printing on the press was available.

What is claimed is:

1. A planographic printing plate comprising a base plate having ink-receptive and ink-repellent areas thereon, said ink-repellent area being covered with an adhesively bonded layer of a polymerized and cured composition which comprises;

a. a photopolymerizable organopolysiloxane of the general formula:

$$\left[ \overset{R^1}{\underset{}{HC}} = \overset{R^2}{C} - \underset{\underset{O}{\|}}{C} - O - R^3 - \overset{(CH_3)_a}{Si}O_{\frac{3-a}{2}} \right]_l \left[ C_6H_5SiO_{\frac{3}{2}} \right]_m \left[ \begin{matrix} CH_3 \\ | \\ SiO \\ | \\ R^4 \end{matrix} \right]_n$$

where $R^1$ is a hydrogen atom or an unsubstituted or halogen-substituted phenyl radical including chlorophenyl and bromophenyl; $R^2$ is a hydrogen atom or a methyl radical; $R^3$ is a divalent hydrocarbon radical having 1 to 3 carbon atoms, including methylene, ethylene and propylene; $R^4$ is a methyl or trifuoropropyl radical; $a$ is 0 or 1; $l$, $m$ and $n$ are each a positive integer with the proviso that $n$ exceeds 25 while $n/l$ and $n/m$ are from 25 to 2,000, and from 2.5 to 50, respectively;

b. a photosensitizer, and c. a solvent.

2. The planographic printing plate as claimed in claim 1 wherein said $R^1$, $R^2$, $R^3$ and $R^4$ are hydrogen, methyl, propylene, and methyl, respectively.

3. The planographic printing plate as claimed in claim 1 wherein said photosensitizer is selected from the group consisting of 4-phenylphenol, 4-nitroaniline, picramide, 2,6-dichloro-4-nitroaniline, 2,4-dinitrophenol, benzaldehyde, acetophenone, 4-4′-diaminobenzophenone, 4,4′-bisdimethylbenzophenone, benzoquinone, anthrquinone, 1,2-naphthoquinone, 3-methyl-1,3-diazo-1,9-benzanthrone, Malachite Green, Methylene Blue, Chrome Green, Rhodamine Blue, Azo Green- TEG, 2,4,6-triphenyl-pyrilium perchlorate, 2,4,6-triphenylthiapyrilium perchlorate, 2,4,6-triphenylpyrilium-fluoborate, and 2,4,6-triphenylthiapyrilium fluoborate.

4. The planographic printing plate as claimed in claim 1 wherein said solvent is selected from the group consisting of methylethyl ketone, methylisobutyl ketone, benzene, toluene, xylene, trichloroethylene, and tetrachloroethylene.

5. The planographic printing plate as claimed in claim 1 wherein said base plate is made of a material selected from the group consisting of metals and plastics.

* * * * *

UNITED STATES PATENT OFFICE
CERTIFICATE OF CORRECTION

Patent No. 3,886,865 Dated June 3, 1975

Inventor(s) Michihiro Ohto et al

It is certified that error appears in the above-identified patent and that said Letters Patent are hereby corrected as shown below:

In the heading of the Patent [73] should read as follows:

--[73] Assignee: Dai Nippon Printing Co., Ltd. and Shinetsu Chemical Company--.

Signed and Sealed this

Fifth Day of April 1977

[SEAL]

*Attest:*

RUTH C. MASON
*Attesting Officer*

C. MARSHALL DANN
*Commissioner of Patents and Trademarks*